Nov. 6, 1956

P. S. MASSEY ET AL 2,769,455

TANK SWITCHING SYSTEM

Filed Dec. 21, 1953

INVENTORS
P.S. MASSEY
R.C. PEILLY

BY *Hudson & Young*

ATTORNEYS

United States Patent Office 2,769,455
Patented Nov. 6, 1956

2,769,455

TANK SWITCHING SYSTEM

Phillip S. Massey, Dewey, Okla., and Robert C. Reilly, La Junta, Colo., assignors to Phillips Petroleum Company, a corporation of Delaware Application December 21, 1953, Serial No. 399,341

11 Claims. (Cl. 137—122)

This invention relates to tank switching systems. In one specific aspect it relates to an automatic tank switching system for use at a pipeline pumping station.

In the petroleum industry it is common practice to gather oil from a number of wells or storage tanks at a common pumping station, from which the oil is pumped to a refinery. In the operation of such a gathering system it is desirable to provide at the originating pumping station sufficient storage capacity to accommodate temporary excess flows into the station above the station pumping capacity. Otherwise, it is necessary to provide pumping capacity which is greater than that normally needed. It has been proposed to provide such storage capacity by connecting a storage tank directly in the gathering line so that it acts as a surge tank. However, such an arrangement is not entirely satisfactory because it is not practical to measure the quantity of oil pumped from the gathering station. This is evident because the oil may, at times, be flowing into and out of the storage tank simultaneously.

In accordance with the present invention there is provided an improved automatic switching system for use in conjunction with two storage tanks at a pipeline pumping station whereby the quantity of fluid pumped through the station can readily be determined. This invention also provides a reserve storage system to accommodate temporary excess flows into the pumping station which exceed the pumping capacity of the station. These features are accomplished by a switching arrangement which directs the incoming flow into the two tanks alternately in a manner such that the level in both tanks is maintained as low as practical at all times. The fluid accumulated in one tank is pumped from the station while the incoming fluid fills the second tank. By maintaining the levels in both tanks at low values at all times, there is provided sufficient reserve capacity to accommodate short periods when the incoming flow exceeds the pumping capacity of the station. In addition, a third reserve tank is provided to accommodate emergency periods when the incoming flow may exceed the combined storage capacity of the two tanks. A warning device also is provided in conjunction with the reserve tank to indicate excessive rises therein.

Accordingly, it is an object of this invention to provide an automatic tank storage system for use at a pipeline pumping station which enables the quantity of fluid being pumped through the station to be measured.

Another object is to provide maximum storage capacity at a pipeline pumping station with a minimum volume of storage tanks.

A further object is to provide means to measure the fluid passed through a pipeline gathering station.

A further object is to provide a pipeline storage tank system which enables the use of minimum pumping capacity.

A still further object is to provide an automatic warning system for use at a pipeline pump station to indicate when excess quantities of material are accumulated.

Various other objects, advantages, and features of this invention should become apparent from the following detailed description taken in conjunction with the accompanying drawing in which.

Figure 1:
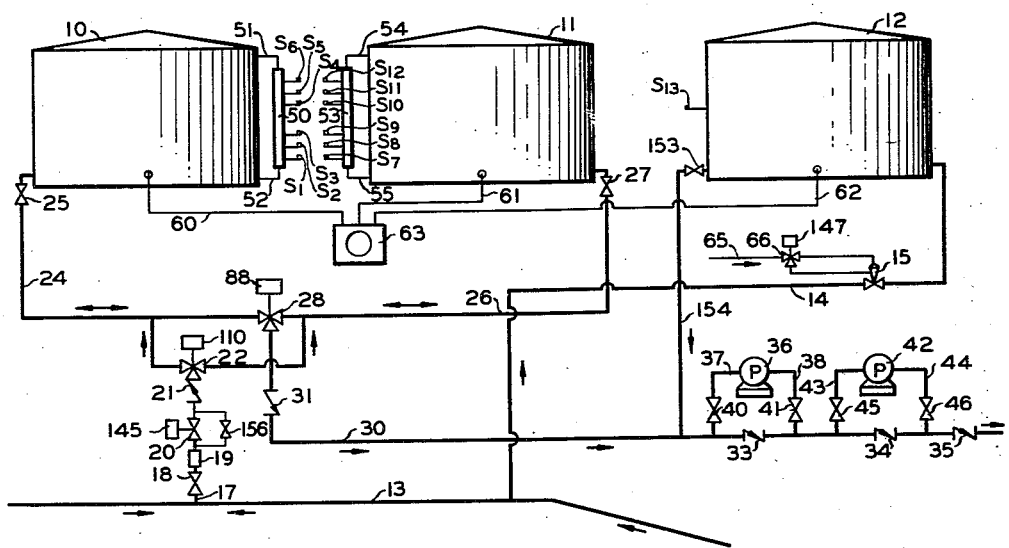
Figure 1 is a schematic representation of the automatic tank switching system of this invention.

Referring now to the drawing in detail and to Figure 1 in particular, there are shown three storage tanks 10, 11 and 12 at a pipeline gathering station. The fluid accumulated at this gathering station from the individual wells or storage tanks flows into the station through a gathering line 13 which communicates with tank 12 through a conduit 14 having a pneumatically operated valve 15 therein. Gathering line 13 also communicates with both tanks 10 and 11. A conduit 17 passes from line 13 through a valve 18, a filter 19, a valve 20 and a check valve 21 to one opening of a three-way motor valve 22. The second opening of valve 22 communicates with tank 10 through a conduit 24 having a valve 25 therein, and the third opening of valve 22 communicates with tank 11 through a conduit 26 having a valve 27 therein. Conduits 24 and 26 also communicate with respective openings of a three-way motor valve 28. The third opening of valve 28 is connected to an outlet conduit 30 through a check valve 31. A series of three check valves 33, 34 and 35 is disposed in outlet conduit 30 downstream from check valve 31. A first pump 36 is connected in parallel with check valve 33 by conduits 37 and 38 which contain respective valves 40 and 41, and a second pump 42 is connected in parallel with check valve 34 by means of conduits 43 and 44 which contain respective valves 45 and 46.

A first standpipe 50 is connected to tank 10 by conduits 51 and 52 so that the liquid level in standpipe 50 is the same as the liquid level in tank 10. A plurality of liquid level operated switches $S_1$, $S_2$, $S_3$, $S_4$, $S_5$ and $S_6$ is disposed in standpipe 50. A second standpipe 53 is connected to tank 11 by conduits 54 and 55 such that the liquid level in standpipe 53 is the same as the liquid level in tank 11. A plurality of like switches $S_7$, $S_8$, $S_9$, $S_{10}$, $S_{11}$ and $S_{12}$ is disposed in standpipe 53, and a switch $S_{13}$ is mounted at approximately the midpoint in the vertical wall of tank 12. Conduits 60, 61 and 62 communicate between lower regions of respective tanks 10, 11 and 12 and a pressure gage 63 which provides a continuous record of the pressures exerted by the liquids in the three tanks. The pressure exerted by a column of liquid is directly proportional to the height of the column. Thus, by recording the pressures exerted by the liquids in tanks 10, 11 and 12, measurements are provided which are proportional to the heights of the liquids in these tanks. If the cross-sectional areas of the tanks are known, the volumes of liquid in the tanks can readily be computed from the recorded pressures.

The incoming fluid from gathering line 13 is transmitted either to tank 10 or 11 depending upon the position of valve 22. Similarly, fluid is removed from either tank 10 or 11 depending upon the position of valve 28. The fluid entering conduit 30 is pumped from the station by pumps 36 and 42. Valve 15 normally is closed so that tank 12 remains empty. However, should the incoming flow exceed the combined storage capacities of tanks 10 and 11, then valve 15 is opened automatically to direct the incoming flow into the tank 12.

Figure 3:
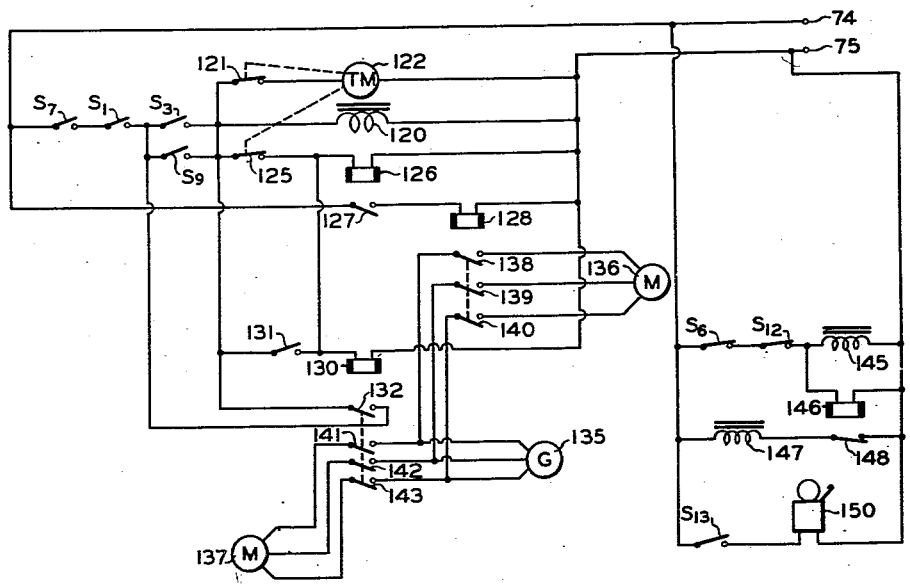
Figure 3 is a schematic circuit diagram of the control system to actuate the pumps and the warning signal in the tank switching system of Figure 1.
Figure 2:
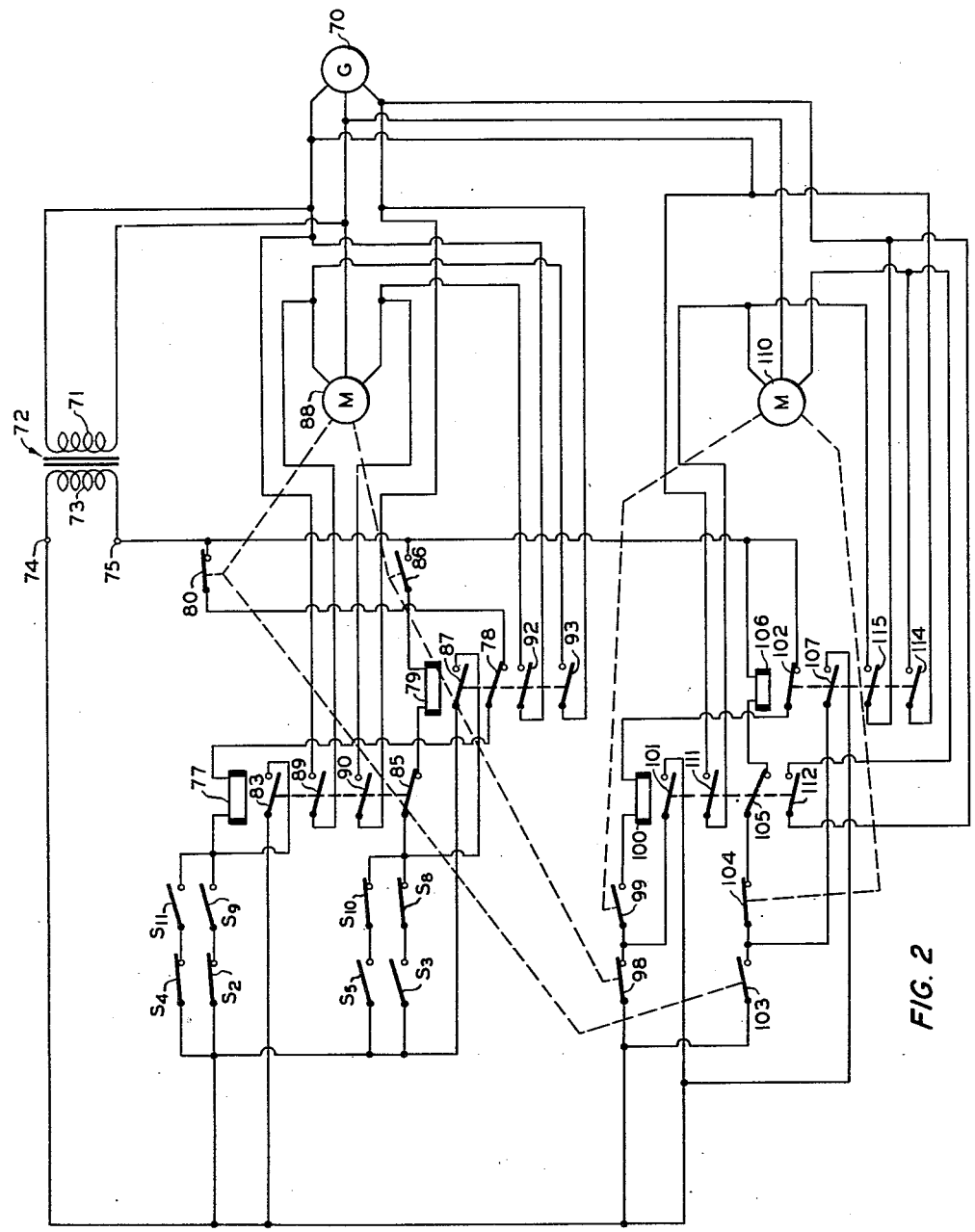
Figure 2 is a schematic circuit diagram of a portion of the electrical control system employed to actuate the switching system of Figure 1.

The electrical circuit employed to control automatically the several valves and pumps in the tank switching system is shown in Figures 2 and 3. With reference to Figure 2, there is shown a generator 70 which provides three-phase alternating current. Two of the output terminals of generator 70 are connected to the respective end terminals of the primary winding 71 of a transformer 72. The output terminals of the secondary winding 73 of transformer 72 are connected to respective terminals 74 and 75 which provide alternating current to operate the switching circuits. A first circuit path is completed between terminals 74 and 75 through switches $S_2$ and $S_9$, the coil of a relay 77, a switch 78 which is actuated by a relay 79, and a switch 80. Switches $S_4$ and $S_{11}$ are connected in series relation with one another and in parallel with series connected switches $S_2$ and $S_9$. A switch 83, which is actuated by relay 77, also is connected in parallel with series connected switches $S_2$ and $S_9$. A second circuit path is completed between terminals 74 and 75 through switches $S_3$ and $S_8$, a switch 85 which is actuated by relay 77, the coil of relay 79 and a switch 86. Switches $S_5$ and $S_{10}$ are connected in series relation with one another and in parallel with switches $S_3$ and $S_8$. A switch 87, which is actuated by relay 79, also is connected in parallel with switches $S_3$ and $S_8$.

The first output terminal of generator 70 is connected to the first terminal of a motor 88 which operates valve 22 through a switch 89, the latter being actuated by relay 77. The second output terminal of generator 70 is connected directly to the second terminal of motor 88. The third output terminal of generator 70 is connected to the third terminal of motor 88 through a switch 90 which is actuated by relay 77. The first terminal of generator 70 is also connected to the third terminal of motor 88 through a switch 92 which is actuated by relay 79. The third terminal of generator 70 is also connected to the first terminal of motor 88 through a switch 93 which is actuated by relay 79. Motor 88 is mechanically coupled to switches 80 and 86.

A third circuit path is completed between terminals 74 and 75 through switches 98 and 99 and the coil of a relay 100. A switch 101, which is actuated by relay 100, is connected in parallel with switch 98. A fourth circuit path is completed between terminals 74 and 75 through switches 103 and 104, a switch 105 which is actuated by relay 100, and the coil of a relay 106. A switch 107, which is actuated by relay 106, is connected between terminal 74 and the junction between switches 103 and 104. Switch 98 is mechanically coupled to switch 86, and switch 103 is mechanically coupled to switch 80.

The first terminal of generator 70 is connected to the first terminal of a motor 110 which actuates valve 28 through a switch 111, the latter being actuated by relay 100. The second terminal of generator 70 is connected directly to the second terminal of motor 110. The third terminal of generator 70 is connected to the third terminal of motor 110 through a switch 112 which is actuated by relay 100. The first terminal of generator 70 is also connected to the third terminal of motor 110 through a switch 114 which is actuated by relay 106. The third terminal of generator 70 is also connected to the first terminal of motor 110 through a switch 115 which is actuated by relay 106. Motor 110 is mechanically coupled to switches 99 and 104.

With reference to Figure 3, there is shown a fifth circuit path between terminals 74 and 75, which path is completed through switches $S_7$, $S_1$, $S_3$ and a motor holding coil 120. A switch 121 and a timing motor 122 are connected in series relation with one another and parallel to holding coil 120. Switch $S_9$ is connected in parallel with switch $S_3$. A switch 125 and the coil of a relay 126 are connected in series relation with one another and in parallel with motor holding coil 120. The coil of a relay 130 is connected in parallel with the coil of relay 126. A sixth circuit path is completed between terminals 74 and 75 through a switch 127, which is actuated by relay 126, and the coil of a relay 128. A switch 131 is connected in parallel with switch 125. A switch 132, which is actuated by relay 130, is connected in parallel with parallel switches $S_3$ and $S_9$. There is also provided a generator 135 which energizes motors 136 and 137 to drive respective pumps 36 and 42. The output terminals of generator 135 are connected to motor 136 through respective switches 138, 139 and 140 which are actuated by relay 128. The output terminals of generator 135 are also connected to motor 137 through respective switches 141, 142 and 143 which are actuated by relay 130.

A seventh circuit is completed between terminals 74 and 75, through switches $S_6$ and $S_{12}$ and a solenoid 145 connected in parallel with the coil of a relay 146. A solenoid 147 and a switch 148, which is actuated by relay 146, are connected in series relation with one another between terminals 74 and 75. A final circuit path is completed between terminals 74 and 75 through switch $S_{13}$ and a bell or other similar warning device 150.

The electrical circuit illustrated in Figure 2 actuates motor valves 22 and 28 to control the flow from gathering line 13 into tanks 10 and 11 and the flow from these tanks through outlet conduit 30. Float switches $S_1$—$S_{13}$, which can be of the type described in Catalog Sections II and V (1949) of Magnetrol Inc., Chicago, Ill., are adapted to be actuated by the rising liquid in respective standpipes 50 and 53 and tank 12. The odd-numbered switches normally are open in the absence of a liquid rise to the level of the switch, whereas the even-numbered switches normally are closed in the absence of a liquid rise to the level of the switch. In order to explain the operation of the switching circuit of Figure 2, it is assumed that valve 22 initially is positioned such that the flow from gathering line 13 is into tank 11, and valve 28 initially is positioned such that tank 10 is in communication with conduit 30. It will further be assumed that both tanks 10 and 11 initially are empty. When the level of liquid in tank 11 rises to switch $S_9$, this switch is closed to complete a circuit between terminals 74 and 75 through switches $S_2$, $S_9$, the coil of relay 77, switch 78 and switch 80 (Figure 2). When relay 77 is energized, switches 89 and 90 are closed to connect motor 88 to generator 70. This starts rotation of motor 88 which immediately opens switch 98 and closes switch 86. Motor 88, which operates valve 28, continues to rotate until valve 28 is switched so that tank 11 is in communication with conduit 30. At this point switch 80 is opened by motor 88. This deenergizes relay 77 to open switches 89 and 90, thereby terminating the rotation of motor 88. Switch 103 closes when switch 80 opens.

The closure of switch 103 completes a circuit between terminals 74 and 75 through switches 103, 104 and 105 and the coil of relay 106. The energization of relay 106 closes switches 114 and 115 to connect motor 110 to generator 70. This starts rotation of motor 110 which operates valve 22 to connect tank 10 to gathering line 13. Rotation of motor 110 immediately closes valve 99. Motor 110 continues to rotate until valve 22 is reversed completely, at which time switch 104 is opened to deenergize relay 106. This in turn disconnects motor 110 from generator 70 to terminate the rotation of motor 110.

The fluid from gathering line 13 then fills tank 10 until the level therein rises to switch $S_3$. The closure of switch $S_3$ completes a circuit between terminals 74 and 75 through switches $S_3$, $S_8$ and 85, the coil of relay 79 and switch 86. The energization of relay 79 closes switches 92 and 93 to connect motor 88 to generator 70 in a reverse manner such that motor 88 rotates in the direction opposite to the rotation previously described. At the beginning of this reverse rotation, switch 103 is opened and switch 80 is closed. Motor 88 continues to rotate in the reverse direction until valve 28 is operated to connect tank 10 with conduit 30. At this point, motor 88 opens switch 86 to deenergize relay 79. This disconnects motor 88 from generator 70 to terminate the motor rotation. At this same time, switch 98 is closed.

Closure of switch 98 completes a circuit between terminals 74 and 75 through switches 98 and 99, the coil of relay 100 and switch 102. The energization of relay 100 closes switches 111 and 112, thereby connecting motor 110 to generator 70 to cause rotation of motor 110 in the opposite direction to that previously described. This reverse rotation of motor 110 immediately closes switch 104. The reverse rotation of motor 110 continues until valve 22 is operated so that gathering line 13 is in communication with tank 11. At the end of this latter rotation, switch 99 is opened to deenergize relay 100, thereby disconnecting motor 110 from generator 70.

It should be observed that the closure of switch $S_9$ results in switch 83 being connected in parallel with series connected switches $S_2$ and $S_9$. Switch 83 thus bypasses switches $S_2$ and $S_9$ so that relay 77 remains energized until rotation of motor 88 is completed. In a similar manner, switch 87 is connected in parallel with series connected switches $S_3$ and $S_8$ to complete the circuit through relay coil 79 until rotation of motor 110 is completed. It further should be observed that the reverse cycle described above is not initiated when the level in tank 10 reaches switch $S_3$ unless the level in tank 11 is below switch $S_8$. Otherwise switch $S_8$ will be open. This condition could occur if the flow from gathering line 13 greatly exceeds the pumping capacity of pumps 36 and 42. If this should occur, the second mentioned switching operation does not take place until the level in tank 10 reaches switch $S_5$, at which time a circuit is completed through switches $S_5$ and $S_{10}$ which are connected in parallel with switches $S_3$ and $S_8$. With respect to tank 11, a similar circuit path is provided through switches $S_4$ and $S_{11}$. Thus, the entire operation is such that during periods of low flow into the pumping station, tanks 10 and 11 remain substantially empty. During periods of high flow they will be filled stepwise. In this manner the levels in both tanks 10 and 11 are kept at a minimum at all times to afford a maximum storage capacity to accommodate temporary high flow rates into the station. Motor operated switches 80, 86, 98 and 103 can be of the Limitorque Valve Control type described in Catalog L-50 of Philadelphia Gear Works, Inc., Philadelphia, Pa.

Pumps 36 and 42 are controlled by the circuit shown in Figure 3. Both switches $S_1$ and $S_7$ must be closed before the pumps can be operated. With these two switches closed, either of parallel connected switches $S_3$ or $S_9$ will complete a circuit to start the pumps. This circuit can be traced from terminal 74 to terminal 75 through switches $S_7$ and $S_1$, either switch $S_3$ or $S_9$, switch 121 and timing motor 122. Motor holding coil 120 also is energized, as is the coil of relay 126. Switches 121 and 125 initially are closed. The energization of relay 126 closes switch 127 to energize relay 128. Relay 130 also is energized by the closure of either switch $S_3$ or $S_9$, and this in turn closes switches 141, 142 and 143 to connect motor 137 to generator 135. Relay 128 incorporates a time delay so that switches 138, 139 and 140 are closed after a predetermined time delay. The purpose of this delay is to avoid excessive currents being drawn from generator 135 which would result from the simultaneous starting of both motors 136 and 137.

Switch 132 is closed by relay 130 to complete a circuit in parallel with switches $S_3$ and $S_9$ so that the two pumps will continue to operate after the liquid level falls below either switch $S_3$ or $S_9$. Timing motor 122 opens switch 125 after a predetermined time interval. The opening of switch 125, in the absence of switch 131, would deenergize relays 128 and 130 to stop the two pumps. However, switch 131 is connected in parallel with switch 125. Switch 131 is a conventional pressure operated switch which is connected in conduit 30 downstream from the two pumps. If the two pumps operate in a proper manner, the resulting pressure closes switch 131 so that the pumps remain in operation until the tank connected to line 30 is drained. At this time switch 131 opens to turn off the pumps. Timing motor 122 continues to rotate to open switch 121 at a later interval than the opening of switch 125. The opening of switch 121 terminates the rotation of motor 122. Holding coil 120 continues to retain motor 122 in this position until this coil is deenergized. Deenergization of coil 120 results in timing motor 122 being reset for a second operation. Timing motor 122 can be of the type shown in Catalog GEC-452, General Electric, Schenectady, N. Y.

If the liquid level should rise as high as either switch $S_6$ or $S_{12}$ in respective tanks 10 and 11, the circuit between terminals 74 and 75 through relay coil 146 is interrupted. This immediately deenergizes solenoid 147 to operate a valve 66 which controls the air pressure applied to valve 15 from a line 65, thereby opening valve 15 to connect gathering line 13 with reserve tank 12. This also deenergizes solenoid 147 to close valve 20. Thus, the flow from gathering line 13 passes into tank 12 until the levels in tanks 10 and 11 fall below both of respective switches $S_6$ and $S_{12}$. Relay 146 closes after a time delay to insure that valve 20 is fully open. If the level in tank 12 should rise as high as switch $S_{13}$, then a circuit is completed between terminals 74 and 75 through a warning device 150 so that appropriate steps can be taken by the operator to open a valve 153 in a conduit 154 between tank 12 and conduit 30 to drain tank 12. Valve 20 can be of the type shown in Catalog 52E (1948), page 40, of General Controls. A pressure relief by-pass valve 156 can be connected in parallel with valve 20. Obviously, valve 15 could be electrically operated, if desired.

From the continuous record of the liquid levels in tanks 10, 11 and 12 provided by indicator 63, it is possible to determine the total fluid passed through the pumping station. This feature accomplishes one of the principal objects of the invention. Because the liquid levels in both of tanks 10 and 11 are maintained at a minimum during normal operation, a maximum reserve storage capacity is provided at all times. With regard to the spacing of switches $S_1$–$S_{12}$, excellent results have been obtained on twenty-four feet high tanks with the switches positioned as follows: $S_1$ and $S_7$, approximately two feet from ground; $S_2$ and $S_8$, approximately two and one-half feet from ground; $S_3$ and $S_9$, approximately three and three-fourths feet from ground; $S_4$ and $S_{10}$, approximately nine and one-half feet from ground; $S_5$ and $S_{11}$, approximately ten and five-sixths feet from ground; $S_6$ and $S_{12}$, approximately eleven and one-third feet from ground. These values should be considered merely as illustrative, however, since satisfactory operation does not depend upon any particular spacing. If the tanks are employed in a cold climate it is desirable to add heating coils to standpipes 50 and 53 to assure smooth operation of the switches and free flow of fluid into and out of the standpipes.

While this invention has been described in conjunction with a present preferred embodiment thereof, it should be obvious that the invention is not limited thereto.

What is claimed is:

1. Fluid storage and removal apparatus comprising, in combination; first and second storage tanks; a first conduit adapted to pass fluid to be stored into said tanks; first switching means to connect said first conduit selectively to said first and second tanks; a second conduit adapted to remove fluid from said tanks; second switching means to connect said second conduit selectively to said first and second tanks; means to operate said first and second switching means whereby fluid is first passed into said first tank until a first predetermined quantity is positioned therein, fluid is then passed into said second tank until a second predetermined quantity is positioned therein, fluid is once again passed into said first tank, and said switching continues so that said first and second tanks are filled alternately, said tank not being filled being connected to said second conduit to remove fluid therefrom; pumping means in said second conduit; and switching means actuated by the quantities of fluid in said tanks whereby said pumping means is actuated when the fluid in said tank to which said second conduit is connected exceeds a predetermined quantity.

2. A liquid storage and removal system comprising, in combination; first and second storage tanks; a first conduit to pass liquid into said tanks; a second conduit to remove liquid from said tanks; a plurality of liquid level actuated switches associated with each of said tanks at spaced levels; first valved switching means to connect said second conduit with said first and second tanks, said first valved switching means being actuated by said liquid level switches to connect said second conduit to one of said tanks when the liquid level therein rises to a predetermined level and to connect said second conduit to the other of said tanks when the liquid level therein rises to a predetermined level; pumping means in said second conduit; means under control of said liquid level switches to actuate said pumping means when the level in the tank to which said second conduit is connected exceeds a predetermined level; and second valved switching means to connect said first conduit with said first and second tanks, said second valved switching means being actuated by said first valved switching means to connect said first conduit to said first tank when said second conduit is connected to said second tank and to connect said first conduit to said second tank when said second conduit is connected to said first tank.

3. The combination in accordance with claim 2 further including means to measure the liquid pumped through said second conduit comprising means to record the liquid levels in both of said tanks as a function of time.

4. The combination in accordance with claim 3 further comprising a third tank; valved switching means actuated by the uppermost liquid level switches in said first and second tanks to connect said first conduit with said third tank when the liquid level in either of said first and second tanks exceeds a predetermined level; and pumping means to connect said third tank to said second conduit.

5. The combination in accordance with claim 4 further comprising a warning device, a liquid level switch attached to said third tank, and means including said last-mentioned switch to actuate said warning device when the liquid level in said third tank reaches said last-mentioned switch.

6. In a pipeline gathering system wherein liquid flow to a pumping station is likely to occur at varying rates which may exceed the pumping capacity of the station at times, an excess flow storage system comprising, in combination, first and second storage tanks; a first conduit to pass liquid into said tanks; a second conduit to remove liquid from said tanks; a plurality of liquid level actuated switches associated with each of said tanks at spaced levels; first valved switching means to connect said second conduit with said first and second tanks, said first valved switching means being actuated by said liquid level switches to connect said second conduit to one of said tanks when the liquid level therein rises to a predetermined level and to connect said second conduit to the other of said tanks when the liquid level therein rises to a predetermined level; pumping means in said second conduit; means under control of said liquid level switches to actuate said pumping means when the level in the tank to which said second conduit is connected exceeds a predetermined level; and second valved switching means to connect said first conduit with said first and second tanks, said second valved switching means being actuated by said first valved switching means to connect said first conduit to said first tank when said second conduit is connected to said second tank and to connect said first conduit to said second tank when said second conduit is connected to said first tank; a third tank; valved switching means actuated by the uppermost liquid level switches in said tanks to connect said first conduit with said third tank when the liquid level in either of said first and second tanks exceeds a predetermined level; conduit means to connect said third tank to said second conduit; and means to measure the liquid pumped through said second conduit comprising means to record the liquid levels in said three tanks as a function of time.

7. Fluid storage and removal apparatus comprising, in combination; first and second storage tanks; a first conduit adapted to pass fluid to be stored into said tanks; first switching means to connect said first conduit selectively to said first and second tanks; a second conduit adapted to remove fluid from said tanks; second switching means to connect said second conduit selectively to said first and second tanks; means to operate said first and second switching means whereby fluid is first passed into said first tank until a predetermined quantity is positioned therein, fluid is then passed into said second tank until a predetermined quantity is positioned therein, fluid is once again passed into said first tank, and said switching continues so that said first and second tanks are filled alternately, said tank not being filled being connected to said second conduit; and means to measure the quantity of fluid in each of said tanks continuously during the storage and removal operation.

8. Liquid storage and removal apparatus comprising, in combination; first and second storage tanks; a first conduit to pass liquid into said tanks; first means to connect said first conduit selectively to said first and second tanks; a second conduit to remove liquid from said tanks; second means to connect said second conduit selectively to said first and second tanks; a plurality of liquid level actuated switches associated with each of said tanks at spaced levels; means actuated by said switches to actuate said first and second means so that said first conduit is connected alternately to said first and second tanks as liquid rises to predetermine levels in said first and second tanks, respectively, and said second conduit is connected to said tank not being filled so that said tanks tend to be filled alternately and stepwise to successively higher levels if fluid is passed through said first conduit at a greater rate than through said second conduit; pumping means in said second conduit; and means actuated by said switches to actuate said pumping means when the liquid level in said tank to which said second conduit is connected exceeds a predetermined level.

9. Liquid storage and removal apparatus comprising, in combination; first and second storage tanks; a first conduit to pass liquid into said tanks; first means to connect said first conduit selectively to said first and second tanks; a second conduit to remove liquid from said tanks; second means to connect said second conduit selectively to said first and second tanks; a plurality of liquid level actuated switches associated with each of said tanks at spaced levels; means actuated by said switches to actuate said first and second means so that said first conduit is connected alternately to said first and second tanks as liquid rises to predetermined levels in said first and second tanks, respectively, and said second conduit is connected to said tank not being filled so that said tanks tend to be filled alternately and stepwise to successively higher levels if fluid is passed through said first conduit at a greater rate than through said second conduit; a third tank; means actuated by said switches to connect said first conduit to said third tank when the liquid level in one of said first and second tanks exceeds a predetermined height; and means to connect said third tank to said second conduit.

10. In a pipeline gathering system wherein liquid flow to a pumping station is likely to occur at varying rates which may at times exceed the pumping capacity of the station, means to accommodate such excess flow into the station comprising first and second storage tanks, a plurality of liquid level responsive means to measure levels at a plurality of spaced positions in each of said tanks, inlet conduit means to deliver liquid to the station, outlet conduit means to remove liquid from the station, and switching means responsive to said liquid level means to connect said first and second conduit means alternately to respective ones of said first and second tanks so that said tanks are filled stepwise to progressively higher levels if liquid is supplied through said first conduit means at a greater rate than it is withdrawn through said second conduit means.

11. The combination in accordance with claim 10 further comprising means to record the liquid levels in both of said tanks as a function of time.

References Cited in the file of this patent

UNITED STATES PATENTS

| | | |
|---|---|---|
| 2,372,448 | Porteous | Mar. 27, 1945 |
| 2,605,780 | Nance | Aug. 5, 1952 |